(12) United States Patent  (10) Patent No.: US 9,255,641 B2
Raible et al.  (45) Date of Patent: Feb. 9, 2016

(54) SADDLE FOR A BRANCH CONNECTION

(71) Applicant: Georg Fischer Rohrleitungssysteme AG, Schaffhausen (CH)

(72) Inventors: Moritz Raible, Ueberlingen (DE); Wolfgang Paul, Gottmadingen (DE); Juergen Roesch, Lenzkirch (DE); Joerg Wermelinger, Schaffhausen (CH)

(73) Assignee: Georg Fischer Rohrleitungssysteme AG (CH)

( * ) Notice: Subject to any disclaimer, the term of this patent is extended or adjusted under 35 U.S.C. 154(b) by 0 days.

(21) Appl. No.: 14/334,834

(22) Filed: Jul. 18, 2014

(65) Prior Publication Data
US 2015/0028581 A1  Jan. 29, 2015

(30) Foreign Application Priority Data
Jul. 23, 2013 (EP) .................................... 13177523

(51) Int. Cl.
*F16L 41/08* (2006.01)
*F16J 15/02* (2006.01)
*F16L 41/12* (2006.01)
*F16L 17/025* (2006.01)
*F16L 17/035* (2006.01)
*F16L 47/28* (2006.01)
*F16L 47/30* (2006.01)

(52) U.S. Cl.
CPC ............. *F16J 15/022* (2013.01); *F16L 17/025* (2013.01); *F16L 17/035* (2013.01); *F16L 41/12* (2013.01); *F16L 47/28* (2013.01); *F16L 47/30* (2013.01)

(58) Field of Classification Search
CPC ............ F16L 47/28; F16L 47/30; F16L 41/12
USPC ........................................ 285/197, 198, 199
See application file for complete search history.

(56) References Cited

U.S. PATENT DOCUMENTS

| 931,011 | A | * | 8/1909 | Hawley et al. ................. 251/146 |
| 1,641,879 | A | * | 9/1927 | Brady ............................ 285/197 |
| 1,770,960 | A | * | 7/1930 | Wells ............................. 285/199 |
| 2,684,859 | A | * | 7/1954 | Longley ......................... 285/199 |
| 2,973,976 | A | * | 3/1961 | Steinen .......................... 285/197 |
| 3,737,180 | A | * | 6/1973 | Hayes et al. ................... 285/197 |
| 3,807,435 | A | * | 4/1974 | Fenster et al. ................. 285/197 |
| 3,999,785 | A | * | 12/1976 | Blakeley ........................ 285/197 |
| 4,158,461 | A | * | 6/1979 | Francis .......................... 285/197 |

FOREIGN PATENT DOCUMENTS

| AU | 2010200139 A1 | 8/2010 |
| CH | 589250 A5 | 6/1977 |
| DE | 1111469 B | 7/1961 |
| DE | 3213212 C1 | 7/1983 |
| EP | 2090816 A1 | 8/2009 |

* cited by examiner

*Primary Examiner* — David E Bochna
(74) *Attorney, Agent, or Firm* — Harness, Dickey & Pierce, P.L.C.

(57) ABSTRACT

A saddle, in particular a clamping saddle for plastic pipes, containing a branch projection, a saddle piece, center axes (X), (Y) and (Z), and a groove for the arrangement of a seal, wherein the inner cheek of the groove is arranged, throughout the course of the groove, perpendicular to the inner surface of the saddle piece.

12 Claims, 3 Drawing Sheets

-Prior Art-

SADDLE FOR A BRANCH CONNECTION

CROSS-REFERENCE TO RELATED APPLICATIONS

This application claims the benefit and priority of European Application No. 13177523.1, filed on Jul. 23, 2013. The entire disclosure of the above application is incorporated herein by reference.

BACKGROUND

This section provides background information related to the present disclosure which is not necessarily prior art.

TECHNICAL FIELD

The invention relates to a saddle, in particular a clamping saddle, for plastics pipes, containing a branch projection, a saddle piece, center axes (X), (Y) and (Z), and a groove for the arrangement of a seal, as well as the corresponding seal and the arrangement thereof in the saddle.

DISCUSSION

Saddles of this type are known from the prior art. They serve for the connection of branch pipes to medium-carrying pipes. For this purpose, tapping fittings, which are fastened with the aid of such saddles to the medium-carrying pipe, whether by clamping or by another fastening option, are generally used. In addition, such saddles serve also for the connection of the branching lines or further fittings, such as valves, etc.

CH 589 250 discloses a branch connection piece which is composed of a lower half-shell and the saddle or upper half-shell, which are able to be clamped around the basic pipeline. In the saddle or the upper half-shell, a seal runs around the connection opening for the branch. This seal serves to seal off the gap between the saddle and the basic pipeline.

A drawback with systems of the kind which employ an O-ring for the sealing is that the O-ring can be laterally washed out of the sealing groove. In the case of sealing grooves in saddles which are known from the prior art, the two side cheeks run, throughout the course of the groove, parallel to the center axis of the branch connection. As a result of the course of the groove along the curve in the saddle, the cross-sectional area of the groove, as well as the cross-sectional contour of the same, changes. This means, for instance, that the groove has a different cross-sectional area and cross-sectional contour in the saddle sectional plane at 90° to the pipeline axis than in the saddle sectional plane along the pipeline axis. This, in turn, means that, at those extreme points of the course of the groove which along the saddle sectional plane lie at 90° to the pipeline, the O-ring can be laterally washed out, since there the angle between the outer cheek of the groove and the tangent to the pipeline outer surface is maximally acute, which promotes the washing out at this position. Furthermore, the inner cheek of the groove prevents the O-ring from being able to adapt to geometrically optimal requirements. An optimal course of a seal for an O-ring would be that the two cheeks of the groove would stand, throughout the course of the groove, perpendicular to the outer surface of the pipeline to which the saddle is fastened. Due to the constant cross-sectional contour and cross-sectional area which is thereby produced, the same pressure conditions on the seal would occur everywhere and the seal would have the chance to expand optimally in the groove in accordance with its requirements, without being additionally cramped or squeezed at isolated spots.

Unfortunately, such a groove, or a saddle having such a groove, can be created by injection molding only with great difficulty or not at all, since the demolding of the cores is problematic, if not impossible, as a result of the course of the outer cheek, which forms an undercut.

EP 2 090 816 B1 discloses a seal which serves to seal off a pipe and a tapping clamp to be connected thereto. As a result of the pre-curvature of the seal, compressions of the seal are intended to be avoided and hence gap formation prevented. Moreover, the specific design of this seal is intended to ensure leak tightness.

With this seal, the high assembly requirements with a view to ensuring that the seal is correctly installed are disadvantageous.

SUMMARY OF THE INVENTION

An aspect of the invention is to propose a saddle and a therewith associated seal, as well as the arrangement of the said saddle, which ensures optimal leak-tightness even in the event of rising internal pressures between saddle and pipe and which substantially reduces the wash-out risk of the seal. Moreover, the present invention affords better sealing characteristics when the saddle is lifted off, which can occur due to rising internal pressure or changing of the thermal state.

This object is preferably achieved according to the invention by virtue of the fact that the inner cheek of the groove is arranged, throughout the course of the groove, perpendicular to the inner surface of the saddle piece. As a result, the seal is at no place squeezed or compressed such that the working of the seal would no longer be ensured. The conditions for the seal are thus the same at any position of the course of the groove. The inner surface of the saddle piece corresponds to the outer surface of the pipe to which the saddle is fastened, whereby the inner cheek is likewise directed perpendicular to the outer surface of the pipe. The saddle is preferably made of plastic and produced, in particular, by injectionmolding. Preferred plastics which are used for this purpose are technical plastics, in particular POM, PP GF 30 or PVC.

A preferred embodiment consists in the fact that the contour of the groove cross section, or the shape, is constant throughout the course of the groove. The shape of the groove is thus the same at any position, whereby the corresponding seal acquires constant preconditions. The pressure upon the seal is thus everywhere the same, whereby critical spots at which the seal has a tendency to be washed out, as these are known from the prior art, can be avoided.

According to a preferred embodiment, the outer cheek of the groove runs at the two outer extreme points parallel to the center axis (Y) of the saddle, wherein the extreme points lie on the center axis (X), or in the sectional plane of the saddle at 90° to the axis of the pipe to which the saddle is fastened. Starting from the two extreme points, which define the outer cheek and, in conjunction with the inner cheek, predetermine the cross-sectional contour and the area, the groove runs constantly along the inner surface of the saddle piece. In accordance with the saddle size or the size of the branch pipe to be connected, and its bore, as well as the size of the pipe diameter of the pipe to which the saddle is fastened, the cross-sectional contour of the groove, and thus also that of the corresponding seal, is obtained.

Preferably, the angle α which is formed by the inner cheek and the outer cheek is defined by means of the function α=arcsin (inner diameter of connecting pipe (d2))/(outer diameter of pipe to which the saddle is attached (D1))+about 5°. Depending on the pipe outer diameter of the pipe to which the saddle is fastened and the inner diameter of the pipe to be connected or the inner diameter of the branch projection of the saddle, the angle α is now obtained. The 5° therefore stem from the fact that the groove is arranged concentrically, radially offset from the inner diameter of the pipe to be connected, such that it does not directly tangent the envelope surface of the bore. Of course, the concentric offset from the envelope surface of the connecting bore of the groove can also be less than or greater than 5°, and preferably lies within a range from 2-10°, accordingly the groove is closer to or farther away from the envelope surface of the bore which projects through the saddle along the center axis (Y).

Preferably, the angle α between the inner cheek of the groove and the outer cheek amounts, throughout the course of the groove, to at least 20°. Moreover, it has been shown that the angle does not exceed the value of 45°. As already mentioned previously, the cross-sectional contour, and thus also the cross-sectional area of the groove, is dependent on the dimension of the saddle or the arrangement of the groove in relation to the center axis (Y) of the saddle, as well as of the diameter of the pipe to which the saddle is fastened. Thus different angles are obtained in accordance with the structural sizes. For the definition of the contour, the extreme point which lies on the sectional plane of the saddle at 90° to the axis of the pipe to which the saddle is fastened is the adopted basis. At this spot, the outer cheek runs parallel to the axis of the saddle or at right angles to the transversely running axis of the pipe. Furthermore, the inner cheek runs perpendicular to the inner surface of the saddle piece or the outer surface of the pipe, wherein, as a rule, a 1° deviation of the perpendicular course for superior demoldability or as the draft angle is tolerable. The depth of the groove is realized in accordance with the seal. This type of layout of the groove means that the outer cheek runs, throughout the course of the groove, at no position parallel to the inner cheek. Moreover, demolding of the saddle in the case of an injection molding production is ensured, since, as a result of the above-depicted layout of the groove, no undercut can be formed.

The invention is additionally distinguished by the fact that the cross-sectional area is constant. By virtue of the fact that a constant cross-sectional area is present throughout the course of the groove, the seal is nowhere unequally squeezed or deformed, nor do any different pressure conditions arise which act upon the seal.

For the achievement of an optimal form closure, the inner surface of the saddle piece corresponds to the outer surface of the pipe on which the saddle or clamping saddle is disposed.

The seal has an angle β which corresponds to the angle α of the groove.

Furthermore, during the assembly of the saddle, a preload is created upon the seal in order to ensure optimal sealing characteristics.

BRIEF DESCRIPTION OF THE DRAWINGS

An illustrative embodiment of the invention is described with reference to the figures, though the invention not being limited solely to the illustrative embodiment, wherein.

DETAILED DESCRIPTION OF THE PREFERRED EMBODIMENTS

Example embodiments will now be described more fully with reference to the accompanying drawings.

Figure 1:
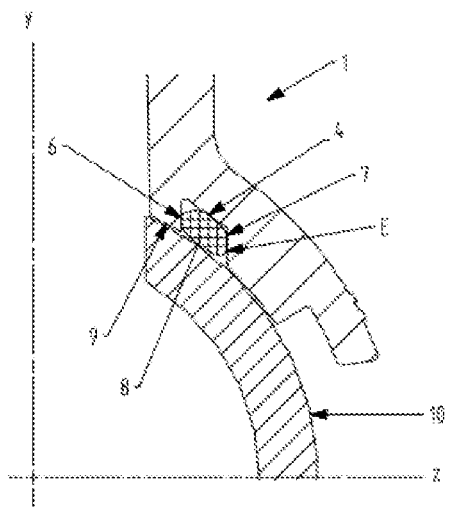
FIG. 1 shows a longitudinal section through a saddle having an O-ring seal and known from the prior art, which saddle is fastened to a pipe.

A saddle (1), for instance for a tapping fitting which is known from the prior art, can be seen from FIG. 1. As the seal, an O-ring (8) is used, though it would also be possible to use other seals which are likewise known from the prior art. Such saddles (1) are generally made of plastic by injectionmolding. This, in turn, requires that the saddle (1) can be demolded or the cores can be removed. Because of this, the courses of the inner and outer cheeks (6, 7) of the groove (4) run parallel to each other and to the center axis (Y) of the saddle (1), which enables problem-freedemolding. The resulting arrangement of the O-ring (8) in this groove (4) is disadvantageous, however. As a result of the course of the groove (4) along the inner surface (9) of the saddle piece (3), which corresponds to the outer surface (10) of the pipe (5), the cross-sectional area, as well as the cross-sectional contour, of the groove (4) changes over the course of the groove. For instance, the cross-sectional area and the contour of the groove (4) along the sectional plane of the saddle (1) parallel to the axis (Z) of the pipe does not correspond to the same area and contour as in FIG. 1, in which the sectional planes of the saddle (1) is represented at 90° to the pipe axis (Z). As a result of this change in the groove (4) over its course, the seal (8) is not subject, throughout the course of the groove (4), to optimal installation conditions. In FIG. 1, the extreme point (E) of the course of the groove is represented. It lies on the sectional plane of the saddle (1) at 90° to the axis (Z) of the pipe. The angle which at this point (E) is formed between the outer cheek (7) and the tangent to the outer surface (10) of the pipe (5) is maximally acute, whereby the O-ring (8) is disadvantageously squeezed. At this spot, moreover, the O-ring (8) has a tendency to be washed out when the saddle (1) is lifted off. The inner cheek (9) of the groove prevents the O-ring (8) from being able to orientate itself optimally according to its requirements. Optimal sealing, as well as prevention of escape or washing out of the seal, is hence not ensured.

Figure 2:
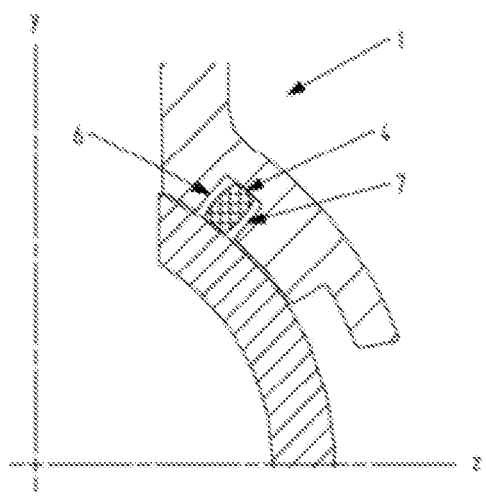
FIG. 2 shows a longitudinal section through a saddle, which shows a theoretical optimum of a groove for the arrangement of a seal.

FIG. 2 shows a groove (4) which is optimal for the arrangement of a seal or of an O-ring. The cross-sectional area and the contour of the groove (4) remain constant throughout the course of the groove (4), whereby the seal is everywhere subject to the same conditions. This shape of the groove (4) is not, or only at enormously high cost, producible by injection molding, since, as a result of the orientation of the outer cheek (7), an undercut is formed perpendicular to the inner surface (9) of the saddle piece (3), whereby the injection molded part can no longer bedemolded.

Figure 3:
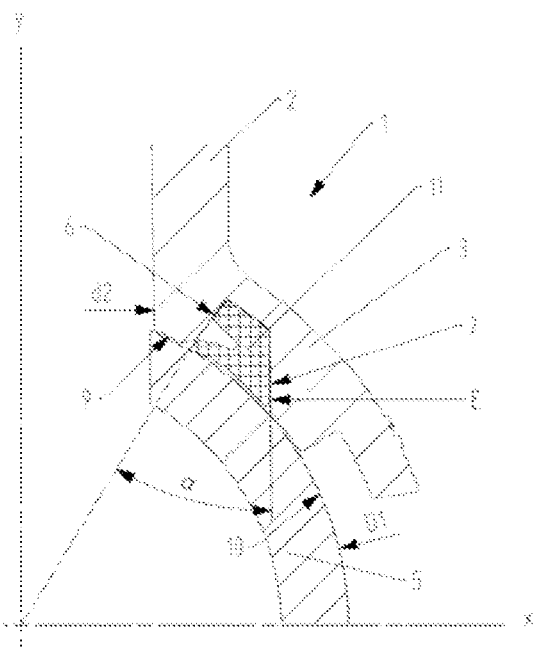
FIG. 3 shows a sectional view through the sectional plane of the saddle according to the invention, at 90° to the axis of the pipe to which the saddle is fastened.
Figure 4:
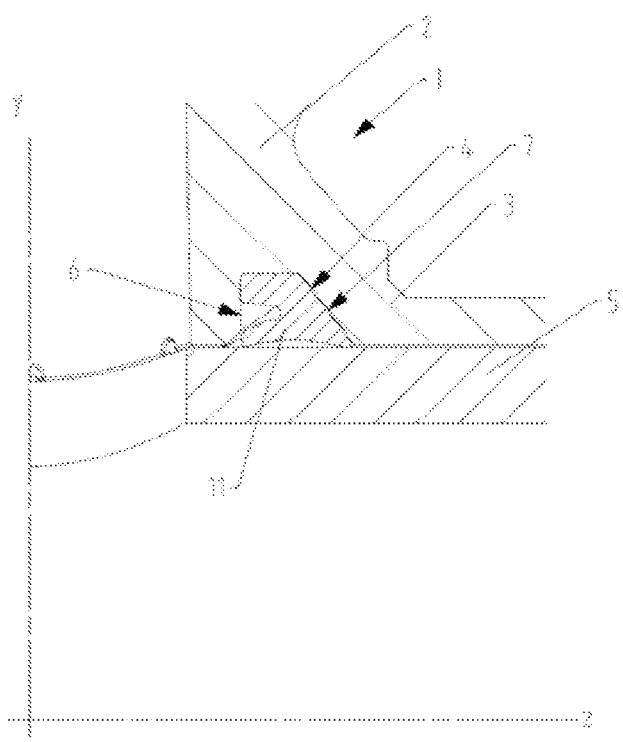
FIG. 4 shows a sectional view through the sectional plane of the saddle according to the invention, along the axis of the pipe to which the saddle is fastened.

FIG. 4 shows the sectional view analogous to FIGS. 1 and 2. From this it can be seen that the inner cheek (6) of the groove (4), throughout the course of the groove, is directed perpendicular to the inner surface (6) of the saddle piece (3), which gives the seal (11) the chance to optimally unfold without, as is known from the prior art, being cramped or restricted. As a result of the ever constant wedge shape of the sealing groove for the sealing, the preload upon the seal is distributed evenly on the periphery. Moreover, demoldability is given if the inner cheek (6), throughout the course of the groove (4), is directed constantly perpendicular to the inner surface (9) of the saddle piece (3). In order to ensure the demoldability of the saddle (1) also in relation to the outer cheek (7), the outer cheek (7), in the extreme point (E), runs parallel to the center axis (Y) of the saddle (1), as represented in FIG. 3, wherein a tolerance of around 1° draft angle can obtain. Starting from this contour of the groove (4), the groove (4) runs constantly with the same contour and area, which brings the advantage that the seal (11) is nowhere compressed or squeezed unevenly. The angle α is obtained in accordance with the arrangement of the inner cheek (6) of the groove (4) in the saddle piece (3), which arrangement is defined by the inner diameter (d2) of the bore of the branch projection with the concentric distancing from the envelope surface of the bore (d2) of about 5° and of the diameter of the pipe (5) on which the saddle (1) is fastened. Of course, the angle (α) also remains constant over the course of the groove (4).

FIG. 3 shows the saddle (1) in a 90°-rotated sectional view relative to FIG. 4. From this it can be seen that the groove (4), also in this position, has the same contour, as well as the same cross-sectional area.

The angle α is thus obtained from the function: arcsin (inner diameter connecting pipe or branch projection (2) (d2))/(outer diameter (D1) of the pipe (5) on which the saddle (1) is fitted)+about 5° (offset of the inner cheek (6) from the inner cylinder surface along the center axis (Y)=α.

$$\alpha = \arcsin(d2)/(D1) + \text{about } 5°$$

Figure 5:
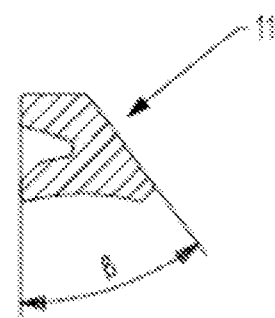
FIG. 5 shows the cross-sectional area of the seal according to the invention.

FIG. 5 shows the cross-sectional area of a seal (11) according to the invention. The seal is made of a flexible plastic which is insertable without difficulty into the groove (4). The angle α of the groove corresponds to the angle β of the seal (11).

Furthermore, the seal (11) has a shape which makes it possible, during fastening of the saddle (1), to deliver a preload to the seal (11). Preferably, the seal is made of elastomers, in particular EPDM or FPM. The entire constellation of sealing groove and seal enables a non-preloaded seal to be used. The installation of the seal in relation to its position in the sealing groove is thus uncritical.

What is claimed is:

1. A saddle, for plastics pipes, comprising a branch projection, a saddle piece, center axes, and, and a groove for the arrangement of a seal, wherein an inner cheek of the groove is arranged, throughout the course of the groove, perpendicular to the inner surface of the saddle piece, wherein an outer cheek runs, throughout the course of the groove, at no position parallel to the inner cheek.

2. A saddle according to claim 1, wherein the contour of the groove cross section is constant throughout the course of the groove.

3. A saddle according to claim 1, wherein the outer cheek and in the inner cheek of the groove form a constant angle α, which is constant throughout the course of the groove.

4. A saddle according to claim 1, wherein the outer cheek of the groove runs at the two outer extreme points parallel to the center axis of the saddle, wherein the extreme points lie on the center axis.

5. A saddle according to claim 1, wherein the angle α between the inner cheek and the outer cheek of the groove corresponds to the function α=arcsin (d2/D1)+about 5° wherein d2 is the inner diameter of a pipe to be connected and D1 is the outer diameter of a pipe to which the saddle is connected.

6. A saddle according to claim 1, wherein the angle α between the inner cheek and the outer cheek of the groove amounts, throughout the course of the groove, to at least 20°.

7. A saddle according to claim 1, wherein the angle α between the inner cheek and the outer cheek of the groove amounts, throughout the course of the groove, to maximally 45°.

8. A saddle according to claim 1, wherein the cross-sectional area of the groove is constant throughout the course of the groove.

9. A saddle according to claim 1, wherein the inner surface of the saddle piece is complimentary to the outer surface of the pipe on which the saddle or clamping saddle is disposed.

10. An arrangement containing a saddle according to claim 1 and a seal, wherein the seal is disposed in the groove, characterized in that the seal has an angle β which is the same as the angle α of the groove, wherein α is defined by the angle between the inner cheek and outer cheek, and wherein β is defined by the angle between opposite outer walls of the seal.

11. A seal for arrangement in a groove of a saddle according to claim 1, wherein the angle β of the seal is the same as the angle α of the groove, wherein α is defined by the angle between the inner cheek and outer cheek, and wherein β is defined by the angle between opposite outer walls of the seal.

12. A saddle for a pipe having a curved outer surface, said saddle comprising:
   a body made of plastic, the body having a curved inner surface complimentary to the curved outer surface of the pipe, the inner surface having a groove with an inner cheek and an outer cheek;
   the inner cheek of the groove being perpendicular to the inner surface of the body; and
   the outer cheek being angled relative to the inner cheek such that the groove is tapered outwardly towards the inner surface of the body.

* * * * *